United States Patent
Pank

(10) Patent No.: US 9,260,853 B2
(45) Date of Patent: Feb. 16, 2016

(54) SELF CLEANING DEBRIS SCREEN FOR RUNOFF WATER SEPARATION APPARATUS

(71) Applicant: Thomas Pank, Walkersville, MD (US)

(72) Inventor: Thomas Pank, Walkersville, MD (US)

(73) Assignee: BAYSAVER TECHNOLOGIES, LLC, Mount Airy, MD (US)

( * ) Notice: Subject to any disclaimer, the term of this patent is extended or adjusted under 35 U.S.C. 154(b) by 258 days.

(21) Appl. No.: 13/728,522

(22) Filed: Dec. 27, 2012

(65) Prior Publication Data
US 2014/0183113 A1    Jul. 3, 2014

(51) Int. Cl.
*E03F 5/04* (2006.01)
*E03F 5/14* (2006.01)
*B01D 29/72* (2006.01)
*E03F 1/00* (2006.01)

(52) U.S. Cl.
CPC ............... *E03F 5/041* (2013.01); *B01D 29/72* (2013.01); *E03F 1/002* (2013.01); *E03F 5/0403* (2013.01); *E03F 5/0404* (2013.01); *E03F 5/14* (2013.01); *E03F 2201/00* (2013.01)

(58) Field of Classification Search
CPC ....... E03F 5/041; E03F 5/0403; E03F 5/0404; E03F 5/10; E03F 5/105; E03F 5/14; E03F 5/16; B01D 29/72
USPC ............ 210/156, 170.03, 254, 299, 305, 354, 210/356, 388, 391, 521, 532.1, 538, 747.2, 210/747.3, 785
See application file for complete search history.

(56) References Cited

U.S. PATENT DOCUMENTS

| | | | | |
|---|---|---|---|---|
| 809,201 | A * | 1/1906 | Lutz | 404/4 |
| 1,302,839 | A * | 5/1919 | Olson | 210/156 |
| 1,911,508 | A * | 5/1933 | Hoff | 210/356 |
| 2,463,814 | A * | 3/1949 | Skinner | 210/354 |
| 3,263,817 | A * | 8/1966 | Buckley | 210/388 |
| 3,471,024 | A * | 10/1969 | Doucet | 210/354 |
| 5,746,911 | A | 5/1998 | Pank | |
| 6,264,835 | B1 | 7/2001 | Pank | |
| 7,005,060 | B2 * | 2/2006 | Pitt et al. | 210/170.03 |
| 7,722,763 | B2 * | 5/2010 | Benty et al. | 210/170.03 |
| 7,875,174 | B2 | 1/2011 | Pank | |
| 2005/0082212 | A1 * | 4/2005 | Wade | 210/170 |
| 2008/0217257 | A1 * | 9/2008 | Pank | 210/747 |

* cited by examiner

*Primary Examiner* — Christopher Upton
(74) *Attorney, Agent, or Firm* — Ditthavong & Steiner, P.C.

(57) ABSTRACT

A runoff water vault may be divided into an input chamber which receives runoff water and a second chamber which also separates and stores buoyant and non-buoyant materials separated from the runoff water stream. While the separators in such systems remove particles of different densities than water quite well, they have difficulty in removing neutrally buoyant debris. Screens are added into the water flow stream to catch and remove particles of neutral buoyancy. The screens are mounted in a manner which permits lateral movement of the screen relative to the water flow, such as shaking and/or flexing. Screen movement imparts pressure differential across the screen perforations releasing debris trapped against the screen, so that the debris will fall into an entrainment area and allow increased flow through the screen. The screens may also include one or more turbulator fins for intersecting the water flow and transferring energy to the screen, imparting lateral movement to the screen.

2 Claims, 3 Drawing Sheets

SELF CLEANING DEBRIS SCREEN FOR RUNOFF WATER SEPARATION APPARATUS

PRIORITY

This application claims priority from provisional application 611582330 filed on Dec. 31, 2011.

BACKGROUND OF THE INVENTION

The present invention is an enhancement to structures used for sediment removal from a fluid stream by separation, such as the devices taught in taught in U.S. Pat. Nos. 5,746,911; 6,264,835 and 7,875,174. These type separators typically have three separate flow paths for influent water, and treat contaminated water by separation of floating materials and non-buoyant materials from the water, at varying levels of efficiency depending on the influent flow rate.

When it rains on a parking lot, a road, or other impervious surface, the water will not permeate into the ground as it once did, and instead this water will runoff and discharge directly into a stream or receiving body. Since these impervious surfaces typically have vehicles or traffic on them, an accumulation of pollutants will occur between rain events. This runoff is then concentrated because it is unable to be absorbed into the ground, and the pollutants are concentrated as well. This has caused a severe degradation of our watersheds. Most of the pollutants are typically washed off in the beginning (which is usually the less intense part of the storm), consequently the first runoff water is the most critical to treat. In an effort to minimize the impacts of this, systems have been developed to treat this water by removing the pollutants by separation or filtration.

Because precipitation occurs at variable rates from a small trickle to a monsoon, the system must be able to capture the pollutants and not release them during the high flow events. Consequently treating stormwater creates additional difficulties because the system must be able to clean the water yet be able to pass very intense storms or flooding could occur. Separators are able to remove floating material and materials that sink in water by skimming and settling methods.

In addition, significant amounts of semi-buoyant or neutral buoyant material is also entrained within the fluid flow. Separators in such systems remove particles of different densities than water quite well, however, they can have difficulty in removing neutrally buoyant debris. This neutral buoyancy material can then pass through the system and be discharged, producing a less than optimal treatment of the run off water.

SUMMARY OF THE INVENTION

The present invention includes one or more perforated plates or screens placed in the fluid stream to catch and remove particles of neutral buoyancy. The screens are located so that the water must flow through the screen while in the treatment vessel. The screens of the present invention are mounted in a manner which permits lateral movement of the screen relative to the water flow, such as flexing and/or shaking. Screen movement imparts pressure differential across the screen perforations releasing debris trapped against the screen, so that debris will fall into an entrainment area, thus removed from the effluent and allowing increased flow through the screen. The present invention can also include one or more turbulator fins attached to the screens for intersecting the water flow and transferring energy to the screen to impart lateral movement to the screen.

The typical first compartment of a typical two compartment separator has an input conduit for feeding the first compartment with runoff water. The first compartment also has an outlet conduit that is partially blocked by a large baffle adjacent the input of the outlet conduit and requires the water to go under the baffle in order to reach the outlet conduit. This will block floating material from the outlet of the first compartment.

The first compartment also has a first transfer conduit of restricted size that carries contaminated runoff water from the first compartment to a second compartment where the contaminants, that are lighter in weight than clean water, move up to the surface and float. Heavier particles in the runoff water fall to the bottom of the second compartment, leaving the water near the center of the second compartment to be relatively clean water however, this water contains semi-buoyant or neutral buoyant materials. A return conduit delivers said relatively clean water from the second compartment to the outlet conduit of the first compartment.

The present invention adds a porous or screened basket to the second compartment through which the water entering the compartment must flow prior to exiting the second compartment through the return conduit. The screens trap semi or neutral buoyant materials and remove them from the fluid stream. The particles are collected in the basket for later removal. The screens of the basket can become clogged with material removed from the water flow and thus imped water throughput or cause overflow conditions which may reduce contaminate removal. In order to avoid clogging, the screens are mounted in a manner which allows movement of the screens, including flexing and or shaking of the screens. The flexing and shaking dislodges material and debris from the screens. In addition, one or more turbulator fins can be attached to the basket and/or individual screens to enhance flexing and shaking.

In a modified form of the invention the basket can be installed in a well. Alternatively, the outlet of the second chamber can be a direct discharge or can be directed into other chambers. In addition, the inflow to the second chamber may be above or below the water level of the second chamber.

DETAILED DESCRIPTION

Figure 1:
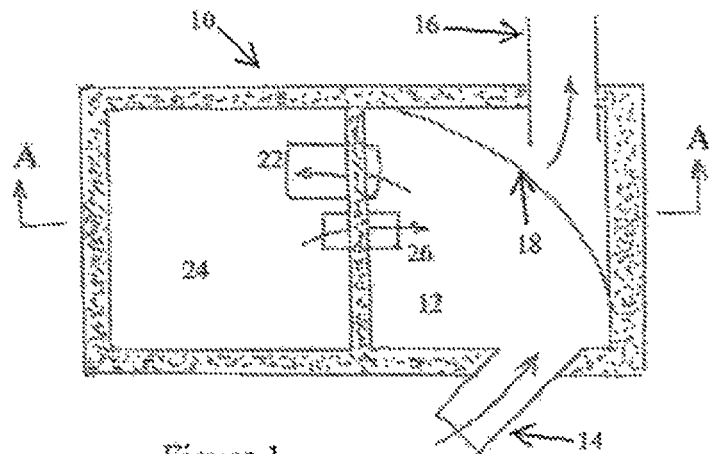
FIG. 1 is a top view of a prior art treatment vessel having two treatment chambers.

As illustrated in FIG. 1, a treatment vessel 10 for collecting run off water, as viewed from above, includes a first chamber 12 with an inlet conduit 14 for the inflow of the run off water. Once the water within the first chamber 12 reaches the level of the outlet conduit 16, water will flow out of the chamber as discharge from the separation vessel. A baffle 18 separates outlet conduit 16 from the main body of the water in first chamber 12. Water flowing in from inlet conduit 14 is diverted by baffle 18 and non buoyant material 20 drops out of the fluid stream, settling to the bottom of chamber 12 as illustrated in FIG. 2.

Figure 2:
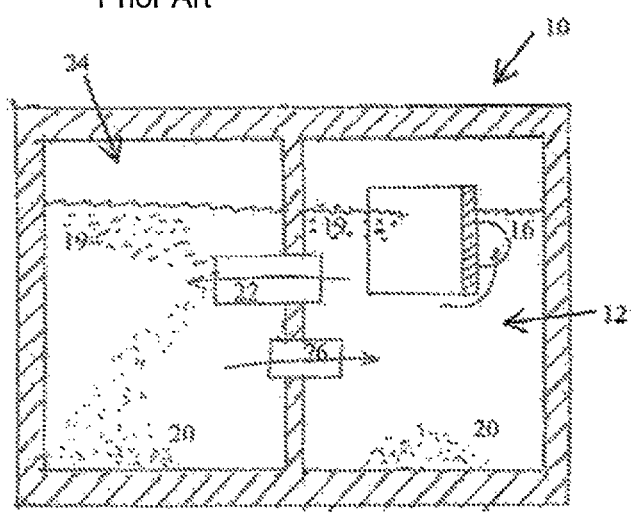
FIG. 2 is a side cross sectional view along line A-A of the prior art treatment vessel of FIG. 1.

As illustrated in FIG. 2, the baffle 18 extends above and below the level of outlet conduit 16 so that floating material 19 in the first chamber 12 cannot flow out outlet conduit 16.

As also illustrated in FIG. 2, a portion of the water in first chamber 12 is diverted through transfer conduit 22, into second chamber 24, where additional non-buoyant debris 20 can settle out as the water passes through second chamber 22. Return conduit 26 draws from below the water surface 26 of second chamber 24 avoiding the return of floating materials 19 to the first chamber 12.

A separator as illustrated in FIGS. 1 and 2, can allow semi or neutral buoyant materials to travel through both chambers of the separation vessel 10 and out the outlet conduit 14.

Figure 3:
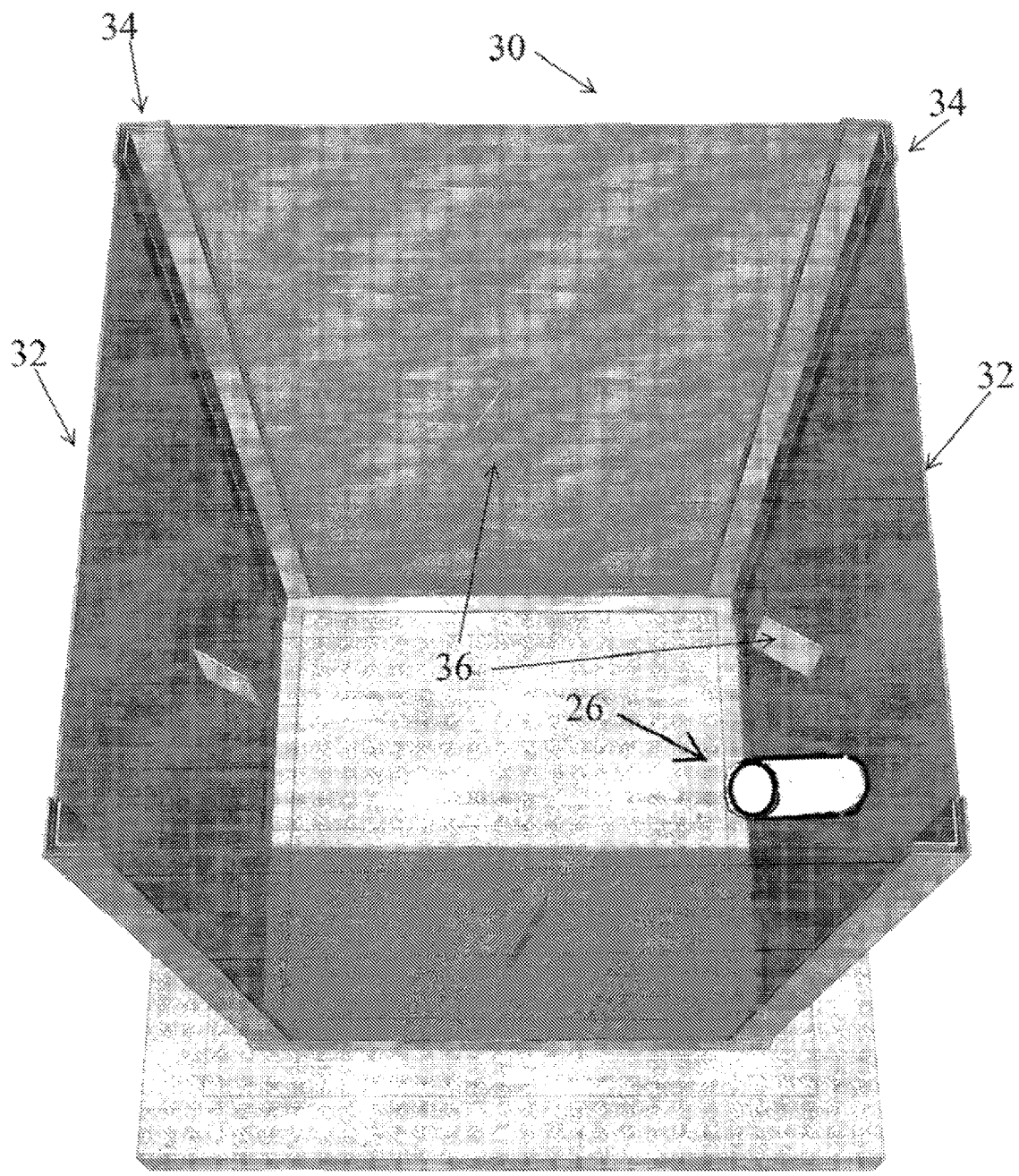
FIG. 3 is a perspective view of an exemplary basket of the present invention.
Figure 4:
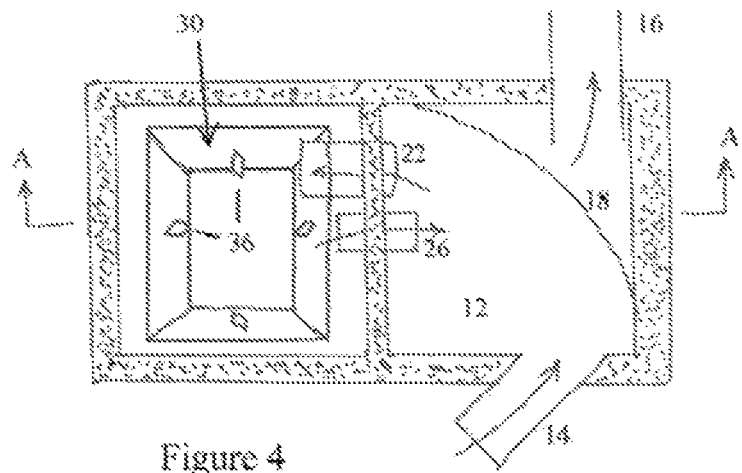
FIG. 4 is a top view of the basket of the present invention inserted into the second chamber of the prior art treatment vessel of FIG. 1.
Figure 5:
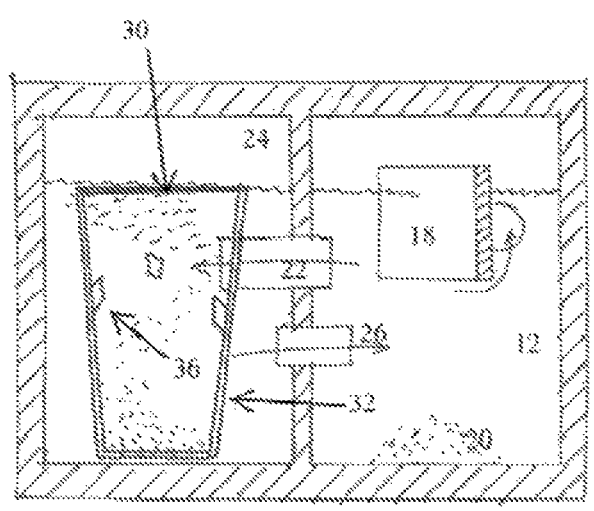
FIG. 5 is a side cross sectional view along line A-A of the treatment vessel of FIG. 3.

A screen basket 30, as illustrated in FIG. 3 is added to the second chamber 24 of the separation vessel 10, as illustrated in FIGS. 4 and 5. Exemplary screen basket 30 is comprised of four separate screens 32 which make us the four sides of the basket 30 which is illustrated as generally rectangular. Alternatively the basket may have more or less than three sides and may be any polygonal shape or conical or round or any other geometric shape. The basket 30 may be comprised of any number of separate screens or one continuous screen.

Transfer conduit 26 extends through one side of the basket 30 so that water enters the basket 30 and must flow through the screens and out of the basket before entering said return conduit and existing second chamber 24. Neutral buoyant material will be trapped against the inside surface of the screens 32 of the basket 30 and fall to the bottom of the basket for later removal during maintenance. Neutral buoyant material will thus be separated from the water exiting the basket 30 into second chamber 24. When material separated by the screens 32 is pressed against the inner surface of the screens by the water flow, the flow through the basket can be reduced. In order to avoid this adherence of material to the inner surface of the screens 32, each screen is loosely fitted into its frame 34 so as to allow the screen to move in a shaking or flexing manner within its mounting frame 34. The overall shape, strength and integrity of the basket 30 is maintained while allowing for sufficient but restricted movement of the individual screens 32.

In an alternative embodiment, the entire basket can be loosely mounted within the second chamber 24, such as suspension by cable or a flexible seating on the floor of the second chamber 24, so that the entire basket 30 can flex of shake under the flow of the water.

The flexing and shaking of the screens 32 will cause the pressure on the trapped material and the screens to vary, allowing the trapped materials to become loose and fall to the bottom of the basket and thus relieve and flow restrictions.

In order to enhance the flexing and shaking of the screens 32, one or more turbulator fins 36 can be attached to one of more of the screens 32. The water flows into the basket at a tangent to the interior surface of the basket, creating a vortex like flow within the basket. The fins 36 are placed so as to create turbulence within the flow of the water. The fins 36 may be angled toward the flow so that the fins 36 are caught by the flowing water and draw the screens 32 downstream until the displacement of the screen overcomes the force of the water flow and the screen 32 shakes back into position. Alternatively the fins 36 may be angled in the direction of flow and shake the screen 32 as the water flows over the fin 36 and creates eddies and flow turbulence.

I claim:

1. An apparatus for cleaning runoff water comprising:

a unitary vault having a floor, side walls, end walls and a dividing wall defining first and second chambers within said vault;

an input conduit for supplying runoff water to said first chamber at a first elevation above said vault floor;

a discharge conduit spaced above said bottom at said first elevation and having an inlet for receiving water from said vault above said first elevation, a baffle positioned between said input and said discharge conduits, extending across said first chamber, and having a lower edge at a second elevation below said first elevation and a upper edge at a third elevation above said first elevation and above the elevation of said discharge conduit input, such that transfer of floating contaminates on the input side of said baffle to the discharge side is impeded;

a transfer conduit positioned at said first elevation and fed by surface water in said first compartment once said water has risen within said compartment to said first elevation, for delivering such water and floating contaminates into said second compartment at a lower elevation;

a screen basket positioned within said second chamber for receiving said water from said transfer conduit into the interior of said basket, wherein said screen basket further includes a screen frame, wherein at least one independent screen is mounted to said screen frame so as to allow for limited movement of said screen in response to water flow against said screen;

a return conduit with a first end in said second chamber, positioned at a fourth elevation below said second elevation and outside said screen basket so as to receive water after said water has passed through said screen basket, said return conduit extending into said first chamber at said first elevation wherein as the level of water in said second chamber rises, water from below the surface of the water in said second chamber is transported to said discharge conduit without said floating contaminates and is discharged from said vault; and at least one turbulator fin attached to said screen positioned in said water flow from said transfer conduit to cause said screen to shake or flex when water is flowing.

2. A self cleaning screen basket comprising:

a screen frame, wherein at least one screen is movably attached to said frame to allow for limited movement of said screen;

at least one turbulator fin attached to said screen to cause screen movement when water flows across said turbulator fin.

* * * * *